US005723786A

United States Patent [19]
Klapman

[11] Patent Number: 5,723,786
[45] Date of Patent: Mar. 3, 1998

[54] BOXING GLOVE ACCELEROMETER

[76] Inventor: Matthew Klapman, 1 E. Delaware St., Apt. 31J, Chicago, Ill. 60611

[21] Appl. No.: 679,680

[22] Filed: Jul. 11, 1996

[51] Int. Cl.⁶ .................................................. G01M 7/00
[52] U.S. Cl. ............................... 73/379.04; 482/84
[58] Field of Search .......................... 73/11.01, 11.04, 73/12.01, 862.541, 379.04, 379.05, 379.08, 862, 581; 273/454; 2/18; 482/84

[56] References Cited

U.S. PATENT DOCUMENTS

| | | |
|---|---|---|
| 2,767,920 | 10/1956 | Roberson ........................ 482/84 |
| 4,534,557 | 8/1985 | Bigelow et al. . |
| 4,763,284 | 8/1988 | Carlin ........................... 73/379.04 |
| 4,883,271 | 11/1989 | French . |
| 5,184,831 | 2/1993 | Garner .......................... 482/84 |
| 5,279,163 | 1/1994 | D'Antonia et al. ........... 73/861.74 |
| 5,502,841 | 4/1996 | Stanford . |
| 5,553,860 | 9/1996 | Zelikovich .................... 482/84 |

Primary Examiner—Robert Raevis
Attorney, Agent, or Firm—Welsh & Katz, Ltd.

[57] ABSTRACT

These and other objects are provided by a novel boxing glove impact measuring system. The boxing glove impact measuring system includes a boxing glove body and an impact measuring device disposed in the boxing glove body. The system also includes an impact display device.

7 Claims, 3 Drawing Sheets

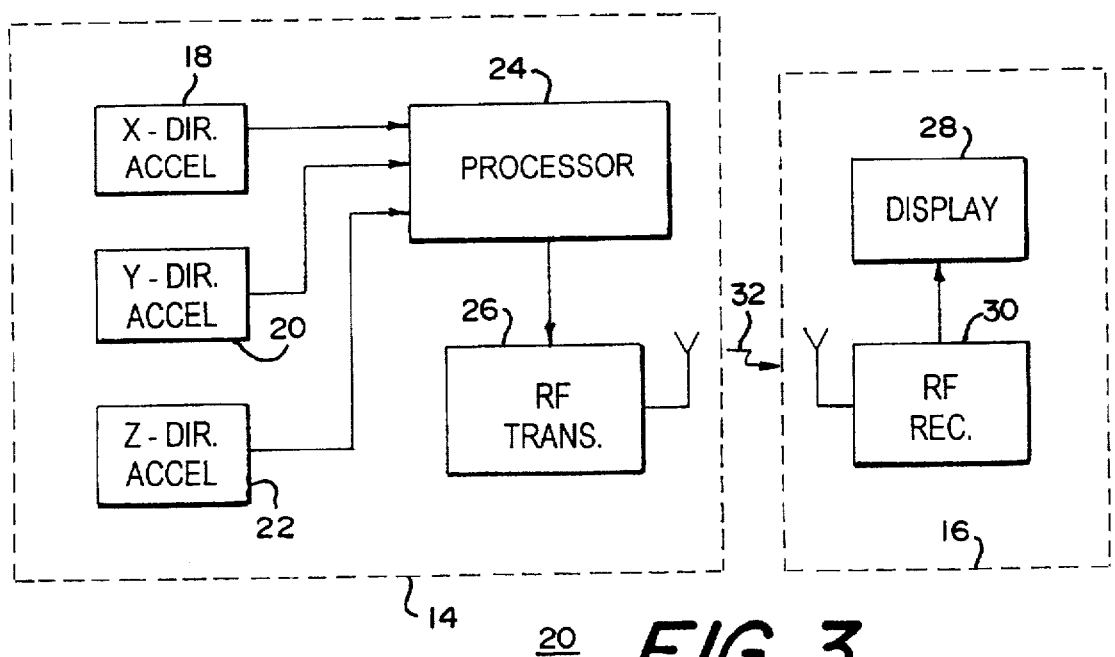
FIG. 3
FIG. 4
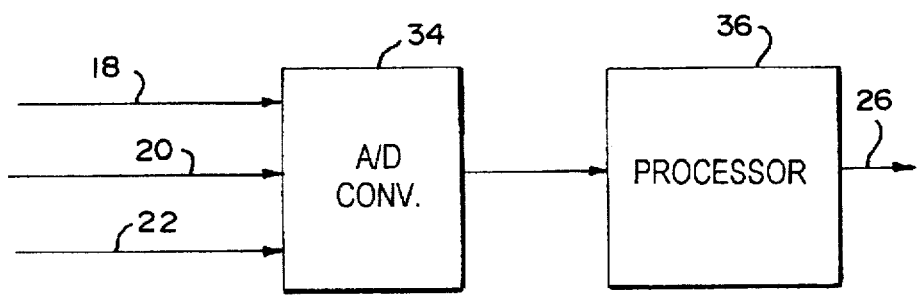

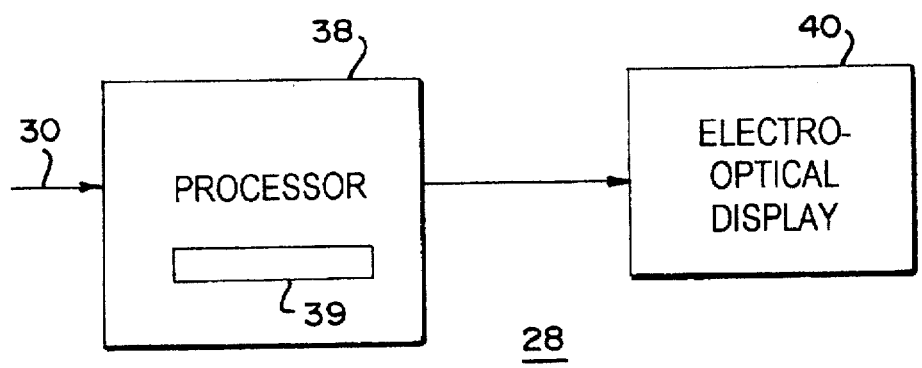
FIG. 5
FIG. 6
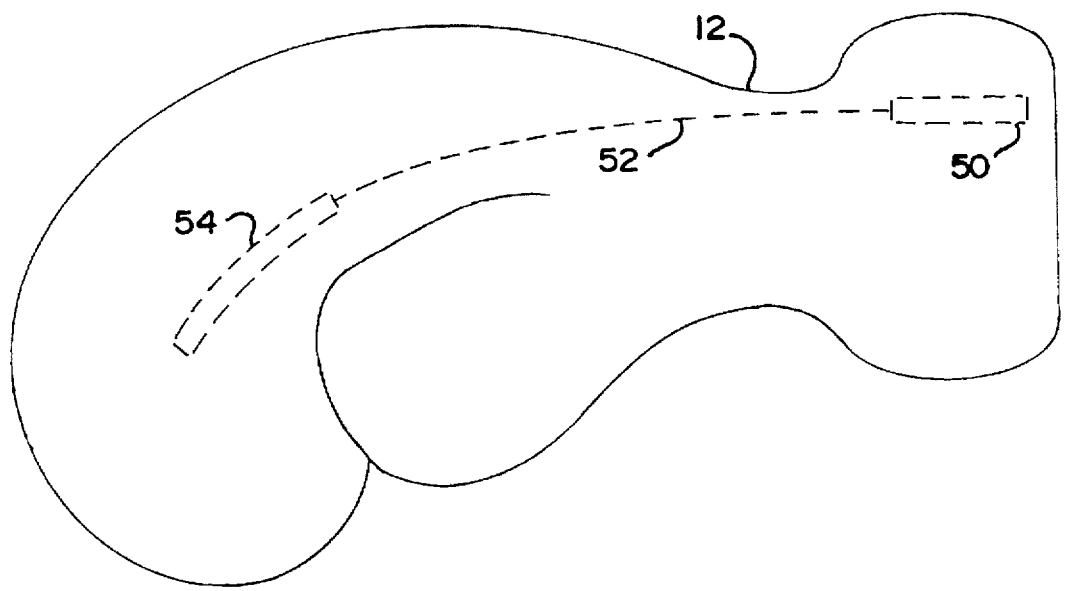

BOXING GLOVE ACCELEROMETER

FIELD OF THE INVENTION

The field of the invention relates to boxing and in particular to measurement of a force of impact as a boxer strikes an opponent.

BACKGROUND OF THE INVENTION

Boxing is a major sport in the United States. Heavyweight boxing matches, in fact, are spectacles rivaling those of any other sport.

A great deal of effort has gone into the development of equipment for the protection of boxers. For example, mouth guards are almost universally worn by boxers during boxing matches. Headgear and head protectors are also worn in many cases. Boxing gloves have been designed to minimize the impact of blows delivered during boxing matches.

No other sport (outside of the martial arts) has the great potential for injury as does boxing. No other sport, in fact, has as its primary object the delivery of blows to the head and body of an opponent.

The direct effect of such blows to the head of a boxer can lead to permanent injury or death. It is well known, in fact, that one of the side effects of boxing is brain injury. Older boxers, in fact, are often referred to as being "punchy" for the detrimental effects often observed in speech or motor movements caused by boxing.

Because of the risk of injury due to boxing, a need exists for a means of monitoring the performance of a fighter. Such means should be lightweight and portable and not interfere with the agility of a boxer.

Accordingly it is an object of the invention to provide a means of measuring an impact of the blows delivered by a boxer to an opponent.

It is a further object of the invention to provide a means of measuring the impact of the blows which does not interfere with a fighters overall performance.

SUMMARY

These and other objects are provided by a novel boxing glove. The boxing glove includes a boxing glove body and an impact measuring device disposed in the boxing glove body.

BRIEF DESCRIPTION OF THE DRAWINGS

FIG. 3 is a block diagram of the impact measuring device of the boxing glove of FIG. 1;

FIG. 4 is a block diagram of an alternate embodiment of the impact measuring device of FIG. 1.;

FIG. 5 is a block diagram of the display system of FIG. 3; and

FIG. 6 is a side view of the boxing glove of FIG. 1 under an alternate embodiment.

DETAILED DESCRIPTION OF AN EMBODIMENT OF THE INVENTION

Figure 1:
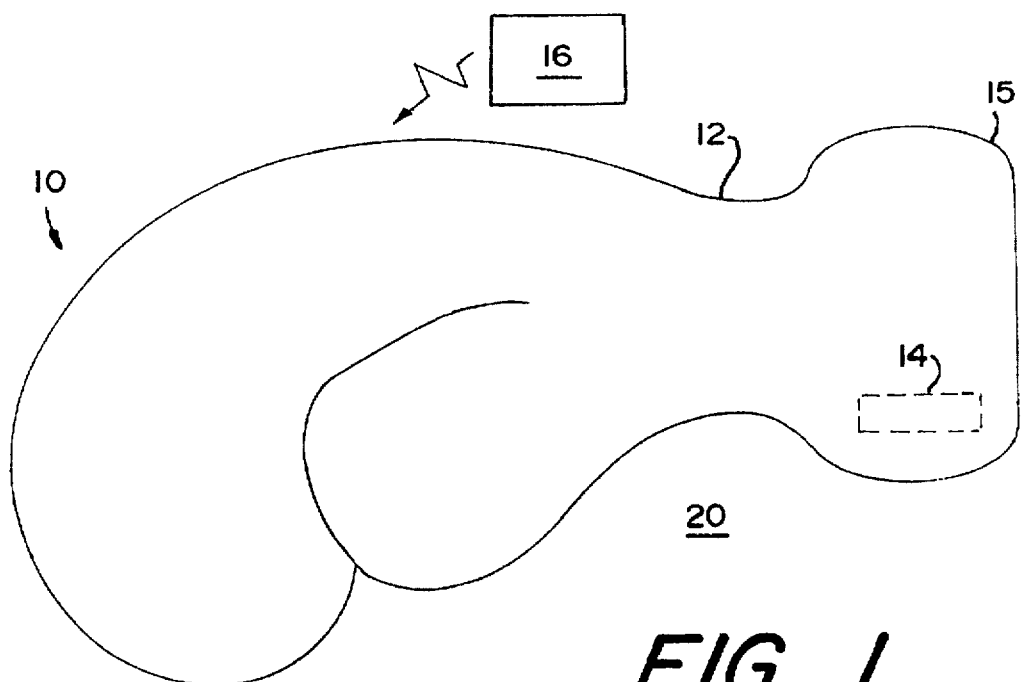
FIG. 1 is a side view of a boxing glove containing an impact measuring device in accordance with an embodiment of the invention.
Figure 2:
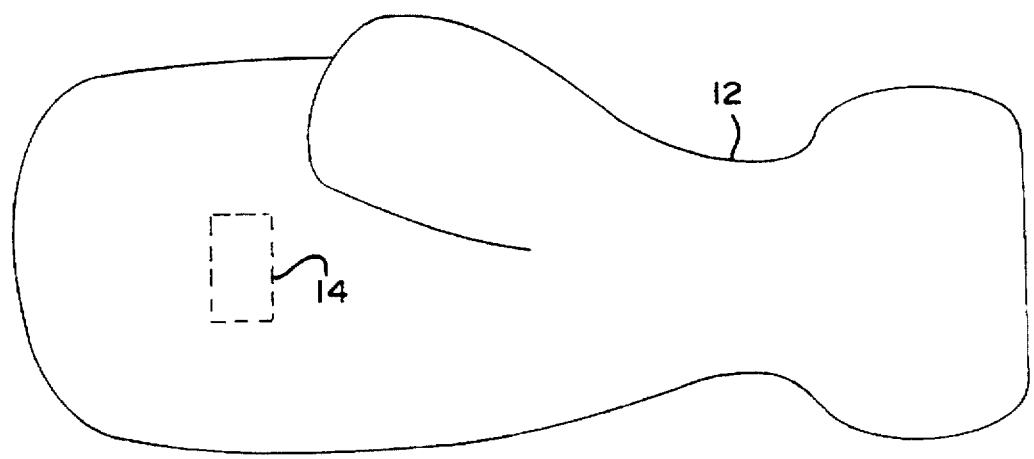
FIG. 2 is a bottom view of the boxing glove of FIG. 1.

FIGS. 1 and 2 are side and bottom view of a boxing glove 10, generally in accordance with an embodiment of the invention. As shown, the body 12 of the boxing glove 10 is of conventional construction with at least one exception. Under the embodiment, an impact measuring device 14 is embedded within the glove 12 in an area protected from direct impact. Such an area includes the cuff 15 of the glove 12 or that portion of the glove 12 adjacent a user's palm, or adjacent an inside surface of a user's fingers.

Alternatively (FIG. 6), the impact measuring device may be a pressure sensor 50 interconnected with a fluid filled bag 54 through a coupling tube 52. The fluid filled bag 54 is disposed adjacent the knuckles of the fighter. Any impact of the glove 12 upon an opponent is immediately translated into a pressure signal by the fluid bag 54 for transmission to the sensor 50 through the coupling tube 52.

Placement of the impact measuring device 14 into the lining of the glove in such an area allows for the force of a blow to be measured without presenting a hazard to the recipient of the blow. The use of miniature electronics also allows the installation of the impact measuring device without significantly increasing the weight of the glove 12.

Under the embodiment, an impact measuring device 14 would be included in the right glove 12 far a right handed fighter, or the left glove 12 for a left handed fighter. For fighters that are equally effective with both hands, or to improve monitoring accuracy, an impact measuring device 14 would be included in both gloves 12.

FIG. 3 is a block diagram of an impact measuring system 20. The impact measuring system 20 includes an impact measuring device 14 and impact display unit 16. The impact measuring device 14 is linked to the impact display 28 via a radio frequency (rf) link 32.

Under the embodiment, the impact measuring device 14 includes at least one accelerometer, but may include as many as three accelerometers 18, 20, 22. Where three accelerometers are used, the three accelerometers 18, 20, 22 are arranged at right angles in a mutually orthogonal relationship to measure acceleration in three-dimensional space.

As shown (FIG. 3), a processor 24 receives the signals from the three accelerometers 18, 20, 22 and formats the impact signal from the accelerometers 18, 20, 22 for transmission to the display 16. Where the accelerometers 18, 20, 22 are analog devices (FIG. 4), an analog to digital (A/D) converter 34 may be necessary to convert a direct current (dc) signal from each accelerometer into a digital signal for use by the processor 36.

Under the embodiment, the processor 24 receives instantaneous readings of the accelerometers 18, 20, 22 and formats the readings for transmission. The format of transmission may also be under either an analog or digital format. Where the signal is analog, the information may be divided into three radio frequency channels and use three rf transmitters 26 and three rf receivers 30 to transceiver three amplitude modulated (AM), or frequency modulated (FM), or phase modulated (PM) rf signals. Alternatively, the three signals of the three accelerometers 18, 20, 22 may be transmitted over three rf channels using a signal format such as pulse width modulation (PWM).

Under another embodiment, the three signals from the three accelerometers 18, 20, 22 are transceived over a single radio frequency channel that has been divided into three information channels. Time division multiplexing (TDM) may be used to transceiver the three signals in three repeating time slots using signals modulated under an AM, FM, PM, or any other appropriate encoding technique.

Digital techniques may be applied to the single radio frequency channel divided into three information channels. A repeating transmission frame may be used having three repeating data fields. The frame may be composed with a header identifying the start of each repeating frame. Guard bits may be transmitted at regular intervals dividing the frame into three data fields for information from the three accelerators 18, 20, 22. The header may also identify the transmission as being part of a particular impact measuring system 14, 16.

Data transmission may also be accomplished under pulse coded modulation (PCM) such as is well known in the cellular telephone industry. The data from each accelerometer 18, 20, 22 may be divided into separate transmissions by the transmitter 26 over a single rf channel, with a header identifying the accelerometer 18, 20, 22 providing the data for the transmission.

The impact measuring system 14, 16 may also be constructed to require acknowledgement of each transmission. Where the transmitter 26 transmits a data packet from a particular accelerometer 18, 20, 22 and does not receive an acknowledgement from the receiver 30, the transmission is repeated until an acknowledgement is received. The acknowledgment may be simply a transmission acknowledgement or the acknowledgement may include error detection and correction information. When information of a particular transmission is not properly received, the transmission is repeated.

Data encryption may also be used to block unauthorized receiving systems 16 from monitoring the impact of a blow. The encryption may be at the bit level using a public encryption key or at the modulation level. Where the encryption is at the modulation level, the encryption may include the use of such modulation techniques as direct sequence spread spectrum (DSSS) (e.g., code division multiple access (CDMA) or frequency hopping (FH) techniques).

Where the data is received by the receiver 30 and display device 28, the data of the three accelerometers 18, 20, 22 is displayed for the benefit of any viewer. The data may be displayed as a simple average or the highest values over any time period (e.g., a one second period) may be displayed.

FIG. 5 is a block diagram of the display 28. As shown the display 28 (FIG. 3) includes a processor 38 for formatting the display and an electro-optical display unit 40. The electro-optical display provides visual imaging under any appropriate technology (e.g., cathode ray tube (CRT), electroluminescent display, passive display, etc.).

The display 28 may also be programmed to display the information from the three accelerometers 18, 20, 22 under a vector format. Under the embodiment, the information of the three orthogonally mounted accelerometers 18, 20, 22 may be displayed as a single arrow indicative of direction and force of a blow using known techniques. Glancing blows may be identified by a substantial lateral component to the vector. An outline of the boxing glove may be created in phantom around the arrow to give realism and visual clues to a viewer of the impact information.

Under another embodiment of the invention, data compression techniques are used to increase battery life of the transmitter 14. Under the embodiment, the processor 24 of the impact measuring device 14 only transmits data which has changed since the last reading. Likewise, the processor of the display 28 only updates those values which have changed since the last reading.

Under the embodiment, the processor 38 of the display 28 maintains a memory 39 of current impact values. During each display sweep of the electro-optical display 40, current values are displayed. When new data values are received by the processor 38 from the impact measuring device 14, those values are immediately substituted into memory 39 for subsequent display.

Under another embodiment of the invention, impact measured and displayed by the impact measuring system 14, 16 may be calibrated using an impact measuring device. For example, a boxing glove 10 may be donned by a boxer (not shown) and a blow delivered to an appropriate stationary object (e.g., a punching bag). The acceleration of the punching bag and deceleration of the boxing glove may be calibrated one against the other at the instant of impact. The mass of the combination of the boxing glove 10 and the boxer's hand and arm may be determined by comparing the speed of the boxing glove 10 and the punching bag after the moment of impact through prior knowledge of the mass of the punching bag and the magnitude of the arc through which the punching bag then swings after impact.

A specific embodiment of a boxing glove impact detection system according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

I claim:

1. A boxing glove comprising:

a boxing glove body; and an accelerometer disposed within the boxing glove body which continuously measures an instantaneous acceleration of the boxing glove.

2. The boxing glove as in claim 1 further comprising a radio frequency transmitter disposed in the body and coupled to the accelerometer for transmitting encoded accelerometer readings to a display.

3. The boxing glove as in claim 1 further comprising three mutally orthogonal accelerometer.

4. The boxing glove as in claim 1 further comprising a processor operatively coupled to the accelerometer and a radio frequency transmitter which detects and transmits only changes in the continuously measured acceleration.

5. A system for measuring a force of impact of a boxing glove of a boxer comprising:

an accelerometer disposed in the boxing glove of the boxer for measuring the force of impact of the boxing glove on an opponent;

a radio frequency transmitter disposed in the boxing glove and coupled to the accelerometer for transmitting impact measurements;

a radio frequency receiver for receiving the impact measurements; and a display coupled to the radio frequency receiver for displaying the measured impacts.

6. A system for measuring a force of impact of a boxing glove of a boxer comprising:

three mutually orthogonal accelerometers disposed in the boxing glove of the boxer for measuring the force of impact of the boxing glove on an opponent;

a radio frequency transmitter disposed in the boxing glove and coupled to the accelerometers for transmitting impact measurements;

a radio frequency receiver for receiving the impact measurements; and a display coupled to the radio frequency receiver for displaying the measured impacts.

7. A display system for displaying an impact level of a boxing glove of a boxer on an opponent, such display comprising:

a radio frequency receiver for receiving a continuously transmitted impact signal level from an accelerometer disposed in the boxing glove of the boxer; and a display coupled to the radio frequency receiver for displaying the continuously transmitted impact signal level of the boxing glove of the boxer.

* * * * *